Jan. 29, 1924.  1,481,953
C. E. BEGEMAN
MEANS FOR ATTACHING THE MEMBERS OF SEPARABLE FASTENERS TO GARMENTS
Filed March 17, 1923
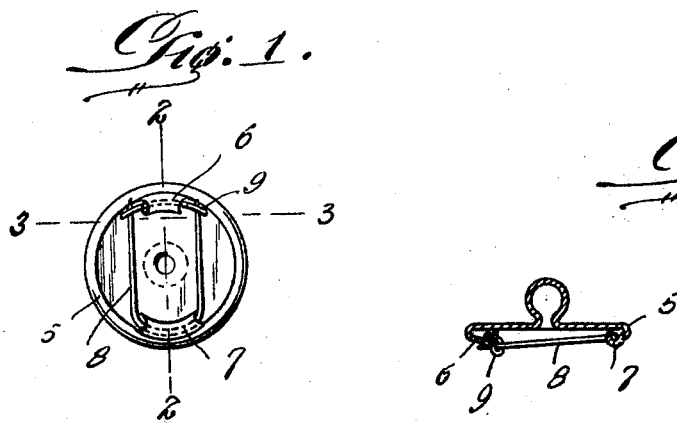
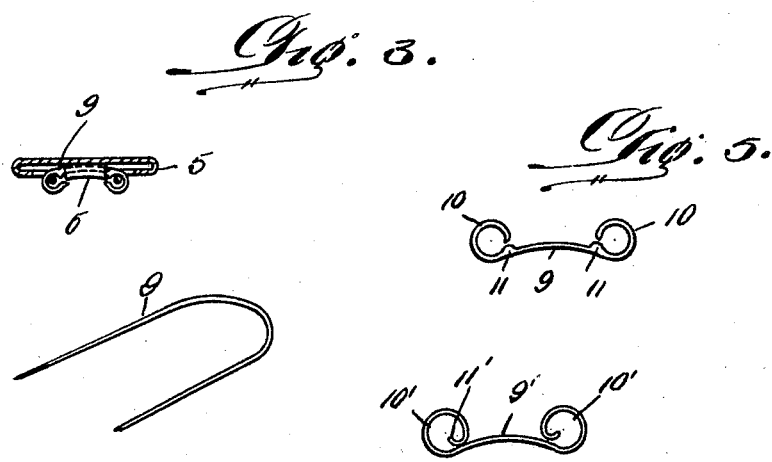
Clara E. Begeman.
Inventor
Witnesses:
J. L. Fox,
N. Berman
Clarence O'Brien
Attorney Patented Jan. 29, 1924.

1,481,953

UNITED STATES PATENT OFFICE.

CLARA E. BEGEMAN, OF MILLEDGEVILLE, ILLINOIS.

MEANS FOR ATTACHING THE MEMBERS OF SEPARABLE FASTENERS TO GARMENTS.

Application filed March 17, 1923. Serial No. 625,686.

*To all whom it may concern:*

Be it known that I, CLARA E. BEGEMAN, a citizen of the United States, residing at Milledgeville, in the county of Carroll and State of Illinois, have invented certain new and useful Improvements in Means for Attaching the Members of Separable Fasteners to Garments, of which the following is a specification.

My invention relates to an improvement in separable fastener members of widely varying types that are equipped with a highly improved means for permitting the ready attachment or detachment to or from garments.

The primary object of the invention is the provision of separable fastener members equipped with such a securing means that embody all of the advantages of simplicity and rigidness of construction, and inexpensiveness of manufacture.

The nature and advantage of the invention will be better understood when the following detailed description is read in connection with the accompanying drawing, the invention residing in the construction, combination, and arrangement of parts as claimed.

In the drawings forming part of this application, like numerals of reference indicate similar parts in the several views, and wherein:—

Figure 1 is a rear elevational view of a wellknown separable fastener member equipped with my improved securing means.

Figure 2 is detail cross section upon the line 2—2 of Figure 1.

Figure 3 is a cross section taken upon the line 3—3 of the same figure.

Figure 4 is a perspective of the pin member of the fastener.

Figure 5 is an elevation of the pin keeper, and

Figure 6 is a similar view of a slightly modified form of pin keeper.

Referring to the drawings in detail, 5 designates a wellknown type of separable fastener member, in this instance, the same including the male member a head and socket fastener, it being understod however, that I do not wish to limit myself to the specific article as shown, as the same is not of the essence of my invention, and may be practically any type of separable member.

My improvement, per se, embodies the provision of a pair of inturned lip members 6 and 7, respectively, which are formed integrally at diametrically opposite sides of the main body with a separable fastener member 5, which form in reality keeper elements for purposes hereinafter set forth. Disposed for swinging movement within the lip or keeper portion 7 is a relatively U-shaped pin member 8, and within the lip or keeper portion 6 upon the opposite side of the separable fastener member is a pin keeper 9, the same embodying as more clearly shown in Figure 5, a single length of wire having its opposite ends bent to form eyes 10. As clearly shown in this figure, the said length of wire 9 is formed adjacent its opposite ends with abutments 11, which are directly beneath the ends of the material forming the said eyes 10, and in view of the above description, it will at once be apparent that after the separate legs forming the U-shaped pin 10 have been engaged through the garment, the same may be forced over the abutments 9 within the eyes 10, whereby the same will be maintained therein until the same are forcibly removed therefrom.

In Figure 6, there is shown a slightly modified form of pin keeper member, which embodies a single length of wire 9' bent upon itself to form eyes 10', the extreme ends of this wire being bent inwardly at 11' within the said eyes 10' for permitting of the forcible disengagement of the pin legs therefrom.

In view of the foregoing, it will at once be apparent that I have provided a highly improved means for detachably securing members of separable fasteners to garments, and although I have shown and described the preferred embodiment of the invention, it is nevertheless to be understood that I do not limit myself to what is herein shown and described, and that minor changes may be made therein, without departing from the spirit and scope of the invention as claimed.

Having thus described by invention, what I claim as new, and desire to secure by Letters Patent is:

1. In a separable fastener member, a pair of inwardly bent lip or keeper portions formed integrally upon opposite sides of the member body, a relatively U-shaped pin loosely disposed within one of the lip or keeper portions, and a pin retaining member rigidly secured within the opposite lip or keeper portions, said pin retaining portions comprising a single length of wire having its ends bent to form eye members for the reception of the ends of said U-shaped pin.

2. In a separable fastener member, a pair of inwardly bent lip or keeper portions formed integrally upon opposite sides of the member body, a relatively U-shaped pin loosely disposed within one of the lip or keeper portions, and a pin retaining member rigidly secured within the opposite lip or keeper portions, said pin retaining portions comprising a single length of wire having its ends bent to form eye members for the reception of the ends of said U-shaped pin, and rounded enlargements formed at the entrance of the pin-retaining member for preventing the casual disengagement of the ends of said pin from said eye portions.

In testimony whereof I affix my signature.

CLARA E. BEGEMAN.